Patented Dec. 31, 1940

2,226,835

UNITED STATES PATENT OFFICE 2,226,835

MIXED UREAS

Alfred Rohm, Leverkusen-I. G. Werk, Germany, assignor to General Aniline & Film Corporation, New York, N. Y., a corporation of Delaware No Drawing. Application January 18, 1940, Serial No. 314,453. In Germany January 24, 1939

4 Claims. (Cl. 260—506)

The present invention relates to mixed ureas containing solubilizing groups and to a process of preparing the same.

In my copending application Ser. No. 304,177, filed November 13, 1939, entitled "Mixed ureas" a process for the manufacture of mixed ureas containing solubilizing groups is described. This process consists in allowing O-aryl-urethanes of watersoluble amines to react in aqueous solution with primary or secondary aliphatic or aromatic amines which may be further substituted and which may or may not contain solubilizing groups.

I have now found that mixed watersoluble ureas can also be obtained by allowing waterinsoluble O-aryl-urethanes to react with aqueous solutions of primary or secondary aliphatic or aromatic amines containing at least one watersolubilizing group, if carrying out the reaction in the presence of an organic solvent for the said urethanes. This synthesis is just as generally applicable as the synthesis described in my copending application and is performed under similar conditions, i. e. the temperature at which the reaction is carried out may vary in wide limits; the reaction is mostly performed at a pH of about 7 to 8, the pH value may, however, be shifted to the acid or alkaline side. The yields are likewise very good. The mixed watersoluble ureas obtained according to the new process are in some cases also obtainable according to the known isocyanate process, however, in lower yields. In many cases, however, it is not at all possible, to prepare the isocyanate necessary whereas the O-aryl-urethanes are quite generally obtainable with excellent yields.

The amine portion of the O-aryl-urethanes may be derived from primary or secondary aliphatic or aromatic amines, free from watersolubilizing groups; these amines may be monamines or diamines. As primary or secondary aliphatic aromatic amines with at least one watersolubilizing groups any of the amines of this group may be used; by way of example a few of these amines may be mentioned: amino-acetic acid, aminoethane sulfonic acid (taurine), methylaminoethane sulfonic acid (methyltaurine), the aminobenzene sulfonic acids, the phenylene diamine sulfonic acids, the aminobenzoic acids, the aminosalicylic acids, the aminodiphenyloxide sulfonic acids, the aminonaphthalene sulfonic acids, the aminohydroxy-naphthalene sulfonic acids and the corresponding secondary amines in which e. g. one hydrogen atom of the amino group is replaced by alkyl or aryl. Also in this process it is in most cases expedient to employ the amine in excess in order to use up the urethane as completely as possible.

The watersoluble mixed ureas obtained according to the new process are valuable intermediates for the preparation of dyestuffs or are already dyestuffs themselves.

The following examples illustrate the invention without, however, limiting it thereto.

Example 1

15.1 g. (=0.1 mol) of 1-amino-4-acetaminobenzene are suspended in 100 cc. suspension and 16 g. of phenyl chloroformate are added drop by drop while stirring. The hydrogen chloride formed is fixed by the addition of 0.1 mol of a tertiary base, for instance dimethylaniline or by the addition of an aqueous solution of an inorganic base. This mixture containing the phenylurethane of 1-amino-4-acetaminobenzene is added to a solution of 0.1 mol of the sodium salt of 2-amino-5 - hydroxynaphthalene-7-sulfonic acid in 400 cc. of water, brought to pH 7.5 and slowly warmed with stirring until solution has become complete. When the diazotization value of the solution no longer decreases the reaction is complete. The phenol is distilled off with steam from the acidified solution and the mixed urea of 2-amino - 5 - hydroxynaphthalene-7-sulfonic acid and 1-amino-4-acetaminobenzene is isolated in very good yield by adding sodium chloride. This urea can not be produced by the isocyanate process, since the corresponding isocyanate cannot be prepared.

Instead of 2-amino-5-hydroxynaphthalene-7-sulfonic acid 2-amino-8-hydroxynaphthalene-6-sulfonic acid can be employed in the same way.

In an analogous manner the O-aryl-urethanes of other amines without watersolubilizing groups, for instance of the 1-amino-benzene-4-sulfamide can be converted into mixed soluble ureas by allowing these urethanes to react with the aqueous solutions of any amine containing watersolubilizing groups in the presence of a suitable organic solvent. The amines used may, as stated in my copending application Ser. No. 304,177, be primary or secondary and may belong to the aliphatic or aromatic series including the cycloaliphatic and heterocyclic series.

Example 2

10.8 g. (=0.1 mol) of 1.4-diaminobenzene are dissolved in 100 cc. of dioxane and are converted into the di-phenyl-urethane of the 1.4-diaminobenzene by adding 32 g. of phenyl chloroformate and 35 g. of dimethylaniline. To this mixture the solution of 0.22 mol of the sodium salt of 2-amino-5-hydroxynaphthalene-7-sulfonic acid in 500 cc. of water is added, the mixture is brought to pH 7.5 and refluxed until solution is complete. Now the solution is rendered alkaline with sodium carbonate and the dimethylaniline is distilled off with steam. Thereupon the mixture is rendered acid with acetic acid and the phenol is driven off by steam. On cooling the di-(2-amino-5-hydroxynaphthalene-7-sulfonic acid)-urea of the 1.4-diaminobenzene separates from the solution and can be purified by redissolving. Instead of 2-amino-5-hydroxynaphthalene-7-sulfonic acid a corresponding quantity of 2-aminonaphthalene-5-sulfonic acid may be used whereby in the same way the corresponding di-urea is obtained.

In a similar way other diamines or the substitution products thereof, such as ethylenediamine, 4.4'-diaminodiphenyl and others may be converted into di-ureas in the presence of suitable solvents.

I claim:

1. Process for the preparation of mixed ureas containing solubilizing groups from waterinsoluble urethanes of the general formula:

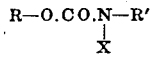

wherein R stands for an aromatic radical, R' stands for a radical selected from the group consisting of aliphatic and aromatic radicals free from solubilizing groups, and X stands for one of the group consisting of hydrogen, alkyl and aryl, which process consists in allowing the said urethanes to react with aqueous solutions of amines selected from the group consisting of primary and secondary aliphatic and aromatic amines containing at least one watersolubilizing group in the presence of an organic solvent for the said urethanes.

2. Process for the preparation of mixed ureas containing solubilizing groups from waterinsoluble urethanes of the general formula:

wherein R stands for an aromatic radical, R' stands for a radical selected from the group consisting of aliphatic and aromatic radicals free from solubilizing groups, and X stands for one of the group consisting of hydrogen, alkyl and aryl, which process consists in allowing the said urethanes to react with aqueous solutions of amines selected from the group consisting of primary and secondary aliphatic and aromatic amines containing at least one watersolubilizing group at medium pH values in the presence of an organic solvent for the said urethanes.

3. Process for the preparation of mixed ureas containing solubilizing groups from waterinsoluble urethanes of the general formula:

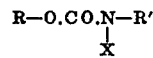

wherein R stands for an aromatic radical, R' stands for a radical selected from the group consisting of aliphatic and aromatic radicals free from solubilizing groups, and X stands for one of the group consisting of hydrogen, alkyl and aryl, which process consists in allowing the said urethanes to react with aqueous solutions of amines selected from the group consisting of primary and secondary aliphatic and aromatic amines containing at least one watersolubilizing group at pH values of about 7 to about 8 in the presence of an organic solvent for the said urethanes.

4. Process for the preparation of mixed ureas containing solubilizing groups from waterinsoluble urethanes of the general formula:

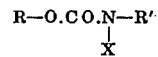

wherein R stands for an aromatic radical, R' stands for a radical selected from the group consisting of aliphatic and aromatic radicals free from solubilizing groups, and X stands for one of the group consisting of hydrogen, alkyl and aryl, which process consists in allowing the said urethanes to react with aqueous solutions af amines selected from the group consisting of primary and secondary aliphatic and aromatic amines containing at least one watersolubilizing group at pH values of about 7 to about 8 and at temperatures between about room temperature and the boiling point of the solutions in the presence of an organic solvent for the said urethanes.

ALFRED ROHM.